(12) United States Patent
McNeil et al.

(10) Patent No.: US 8,555,719 B2
(45) Date of Patent: Oct. 15, 2013

(54) MEMS SENSOR WITH FOLDED TORSION SPRINGS

(75) Inventors: Andrew C. McNeil, Chandler, AZ (US); Gary G. Li, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 305 days.

(21) Appl. No.: 13/012,643

(22) Filed: Jan. 24, 2011

(65) Prior Publication Data
US 2012/0186346 A1    Jul. 26, 2012

(51) Int. Cl.
*G01P 15/125* (2006.01)
(52) U.S. Cl.
USPC ..................... 73/514.32; 73/514.38
(58) Field of Classification Search
USPC ............ 73/514.32, 514.38, 514.29, 514.16, 73/514.36, 504.04, 504.12, 504.14
See application file for complete search history.

(56) References Cited

U.S. PATENT DOCUMENTS

| | | | |
|---|---|---|---|
| 6,718,826 B2 * | 4/2004 | Zarabadi et al. ........... | 73/514.38 |
| 6,935,759 B1 | 8/2005 | Staker et al. | |
| 2005/0005698 A1 * | 1/2005 | McNeil et al. ............. | 73/514.32 |
| 2009/0293617 A1 * | 12/2009 | McNeil et al. ............. | 73/514.32 |
| 2010/0186508 A1 * | 7/2010 | Guenther et al. .......... | 73/504.14 |
| 2010/0326188 A1 * | 12/2010 | Classen et al. ............ | 73/504.12 |
| 2011/0154899 A1 * | 6/2011 | Classen et al. ............ | 73/514.32 |
| 2011/0228372 A1 | 9/2011 | Kato | |
| 2012/0000287 A1 | 1/2012 | Frangi | |
| 2012/0031185 A1 * | 2/2012 | Classen et al. ............ | 73/514.14 |

FOREIGN PATENT DOCUMENTS

DE    102009000407 A1    7/2010

OTHER PUBLICATIONS

EP Application No. EP12151630, European Search Report, Jun. 4, 2012.

* cited by examiner

*Primary Examiner* — Helen Kwok
(74) *Attorney, Agent, or Firm* — Schmeiser, Olsen & Watts LLP; Lowell W. Graham; Charlene R. Jacobsen

(57) ABSTRACT

A microelectromechanical systems (MEMS) sensor (40) includes a substrate (46) and a suspension anchor (54) formed on a planar surface (48) of the substrate (46). A first folded torsion spring (58) and a second folded torsion spring (60) interconnect the movable element (56) with the suspension anchor (54) to suspend the movable element (56) above the substrate (46). The folded torsion springs (58, 60) are each formed from multiple segments (76) that are linked together by bar elements (78) in a serpentine fashion. The folded torsion springs (58, 60) have an equivalent shape and are oriented relative to one another in rotational symmetry about a centroid (84) of the suspension anchor (54).

19 Claims, 2 Drawing Sheets

MEMS SENSOR WITH FOLDED TORSION SPRINGS

TECHNICAL FIELD OF THE INVENTION

The present invention relates generally to microelectromechanical systems (MEMS) sensors. More specifically, the present invention relates to a MEMS sensor with folded torsion springs for size reduction and reduced sensitivity to temperature induced error.

BACKGROUND OF THE INVENTION

Microelectromechanical Systems (MEMS) sensors are widely used in applications such as automotive, inertial guidance systems, household appliances, protection systems for a variety of devices, and many other industrial, scientific, and engineering systems. Such MEMS sensors are used to sense a physical condition such as acceleration, pressure, angular rotation, or temperature, and to provide an electrical signal representative of the sensed physical condition.

Capacitive-sensing MEMS designs are highly desirable for operation in both acceleration and angular rotation environments and in miniaturized devices, and due to their relatively low cost. Capacitive accelerometers sense a change in electrical capacitance, with respect to acceleration, to vary the output of an energized circuit. One common form of accelerometer is a two layer capacitive transducer having a "teeter-totter" or "see saw" configuration. This commonly utilized transducer type uses a movable element or plate that rotates under z-axis acceleration above a substrate. The accelerometer structure can measure two distinct capacitances to determine differential or relative capacitance.

FIG. 1 shows a top view of a prior art MEMS capacitive accelerometer 20 which is adapted to sense z-axis acceleration. Accelerometer 20 is constructed as a conventional hinged or "teeter-totter" type sensor. Capacitive accelerometer 20 includes a substrate 22 having a generally planar surface. Electrode elements 24 and 26 (shown in dashed line form) are formed on the planar surface of substrate 22. In addition, a suspension anchor 28 is formed on the planar surface of substrate 22. A movable element 30, commonly referred to as a "proof mass," is flexibly suspended above substrate 22 by one or more rotational flexures, commonly referred to as torsion springs 32, that interconnect movable element 30 with suspension anchor 28. As shown, an opening 34 extends through movable element 30, and suspension anchor 28 is positioned at an approximate center of opening 34 along a rotational axis 36 of movable element 30.

Movable element 30 is adapted for rotation about rotational axis 36 in response to acceleration, thus changing its position relative to the underlying electrode elements 24 and 26. More particularly, torsion springs 32 are subjected to twisting (i.e., shear stress) about their axes coincident with rotational axis 36 in response to z-axis acceleration applied to movable element 30. This change in position results in a set of capacitors whose difference, i.e., a differential capacitance, is indicative of acceleration. Typically, torsion springs 32 are straight bars formed having an appropriate spring constant that allows for rotation of movable element 30 about rotational axis 36 and return to its neutral position.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

In one aspect, a microelectromechanical systems (MEMS) sensor includes multi-segment folded torsion springs that suspend a movable element, i.e. a proof mass, above an underlying substrate. In an additional aspect, the multi-segment folded torsion springs are oriented to minimize measurement errors due to thermally induced stress. Such a MEMS sensor having the folded torsion springs can be manufactured using existing MEMS fabrication processes. Thus, the folded torsion springs incorporated into a MEMS sensor achieves design objectives of accuracy, compact size, and cost effective manufacturing.

Figure 2:
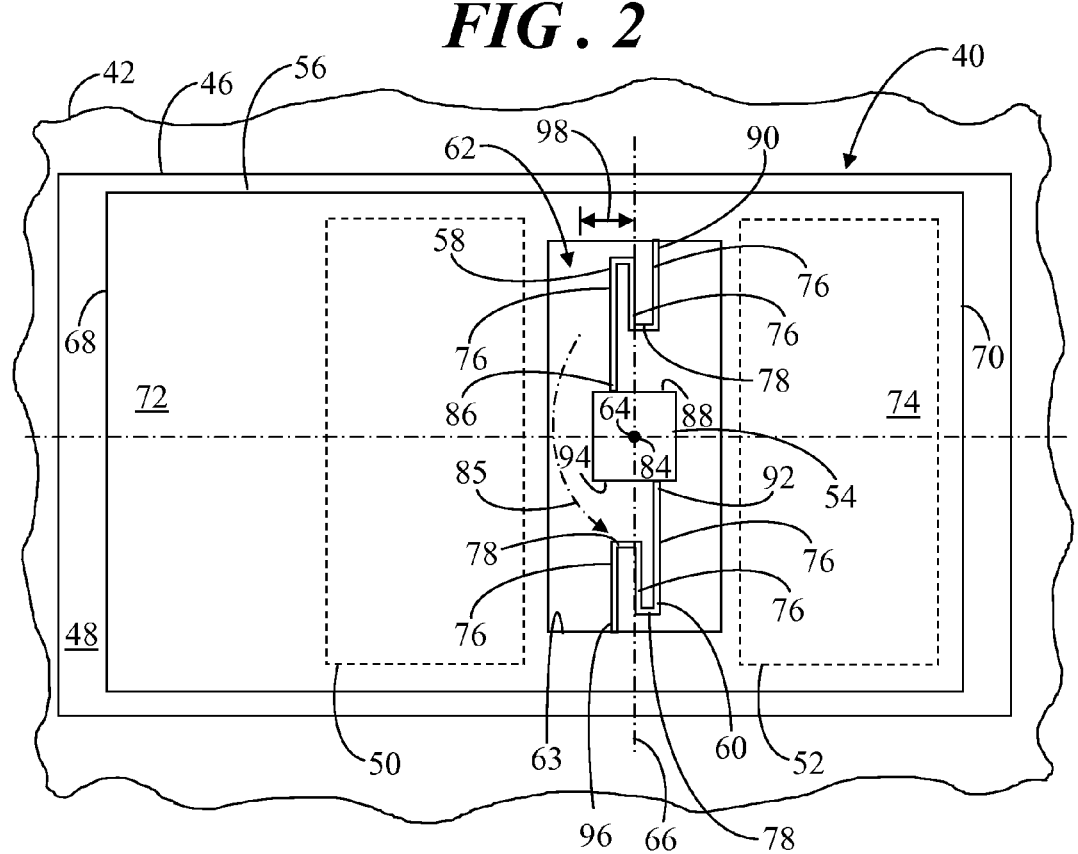
FIG. 2 shows a top view of a MEMS sensor included in a device in accordance with an embodiment.
Figure 3:
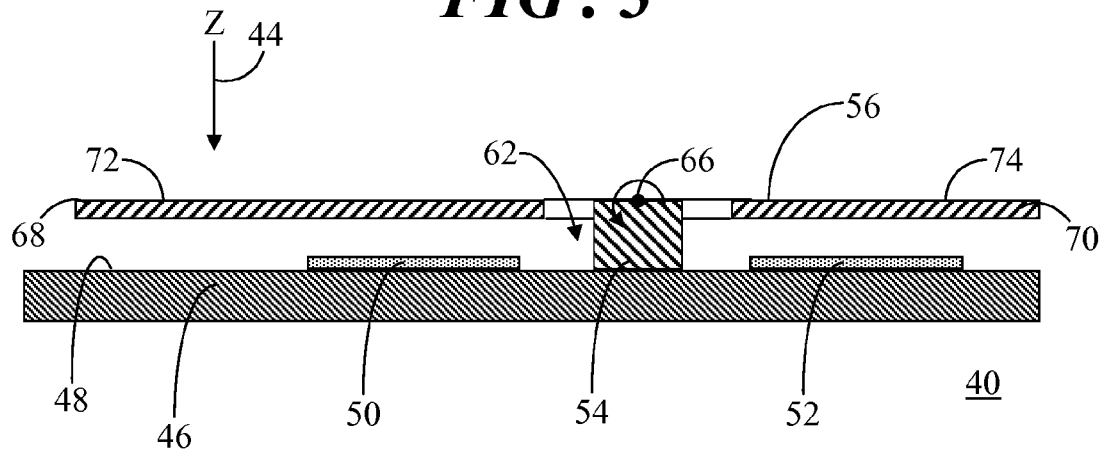
FIG. 3 shows a side view of the MEMS sensor of FIG. 2.
Figure 4:
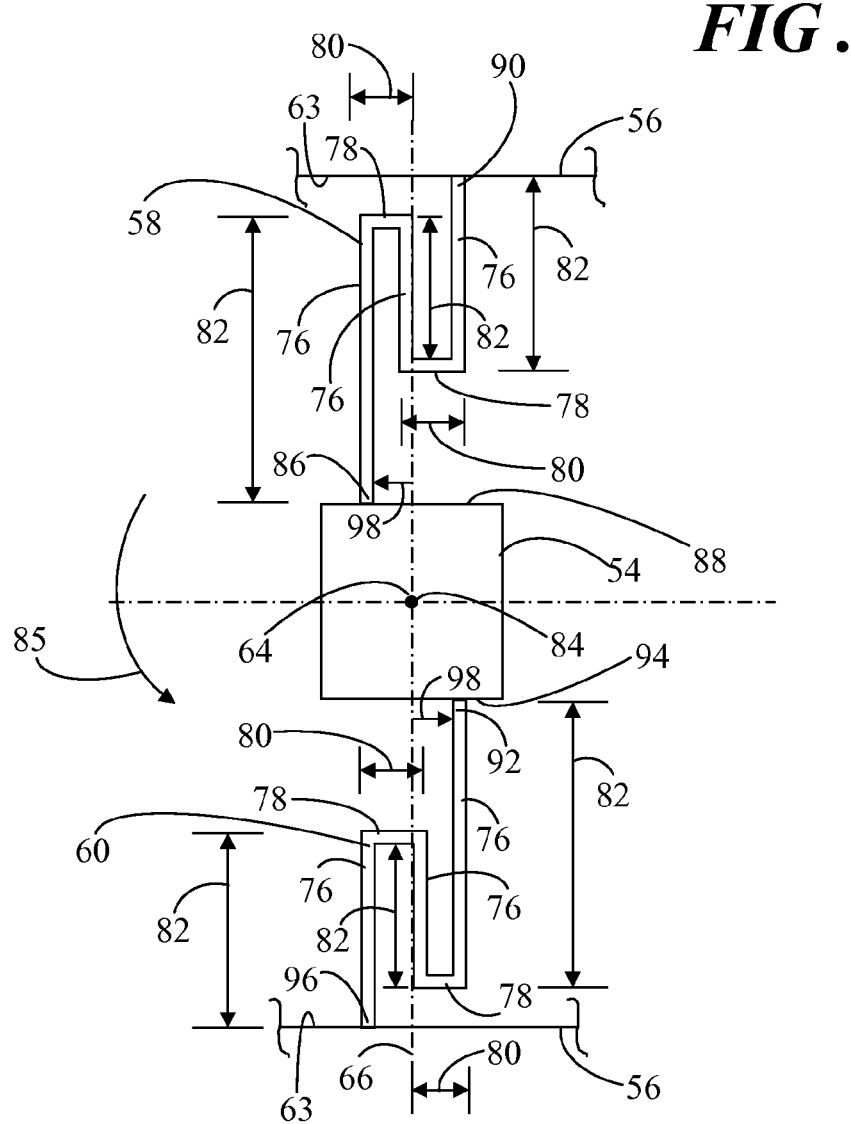
FIG. 4 shows an top enlarged view of a portion of the MEMS sensor of FIG. 2.

Referring to FIGS. 2-4, FIG. 2 shows a top view of a MEMS sensor 40 included in a device 42 in accordance with an embodiment. FIG. 3 shows a side sectional view of MEMS sensor 40, and FIG. 4 shows an enlarged top view of a portion of MEMS sensor 40. MEMS sensor 40, in the form of an accelerometer, is adapted to sense z-axis acceleration, represented by an arrow 44, and is constructed as a "teeter-totter" type sensor. Device 42 can include any of a plurality of devices in which acceleration measurements may be needed. These devices include, for example, automotive systems, inertial guidance systems, household appliances, protection systems for a variety of devices, portable computing and telecommunication devices, handheld game controllers, and many other industrial, scientific, and engineering systems.

MEMS sensor 40 includes a substrate 46 having a generally planar surface 48. Electrode elements 50 and 52 and a suspension anchor 54 are formed on planar surface 48 of substrate 46. A movable element 56 is positioned in spaced apart relationship above planar surface 48 of substrate 46. More particularly, MEMS sensor 40 includes a first folded torsion spring 58 and a second folded torsion spring 60 interconnecting movable element 56 with suspension anchor 54 so that movable element 56 is suspended above substrate 46. The components of MEMS sensor 40 may be formed using existing and upcoming MEMS fabrication design rules and processes that include, for example, deposition, patterning, and etching.

As shown, an opening 62 extends through movable element 56 and is delineated by an inner edge portion 63 of movable element 56. Suspension anchor 54 is positioned at an approximate center 64 of opening 58 along a rotational axis 66 of movable element 56 between a first end 68 and a second end 70 of movable element 56.

When intended for operation as a teeter-totter type accelerometer, a first section 72 of movable element 56 on one side of rotational axis 66 is formed with relatively greater mass than a second section 74 of movable element 56 on the other side of rotational axis 66. In an exemplary embodiment, the greater mass of first section 72 may be created by offsetting rotational axis 66 such that first section 72 is longer than second section 74. Although, the difference in mass between first section 72 and second section 74 is formed by offsetting rotational axis 66, in alternative embodiments, this difference in mass may be accomplished by adding mass to first section 72 through an additional layer of material, by removing mass from second section 74 relative to first section 72, and so forth. Movable element 56 is adapted for rotation about rotational axis 66 in response to acceleration 44, thus changing its position relative to the underlying sensing electrode elements 50 and 52. This change in position results in a set of capacitances whose difference, i.e., a differential capacitance, is indicative of acceleration 44.

Each of first and second folded torsion springs 58 and 60, respectively, have a substantially equivalent shape and similar size that includes multiple segments 76 aligned substantially parallel to rotational axis 66. Segments 76 of each of springs 58 and 60 are linked together in serpentine fashion by bar elements 78 to produce the "folded" configuration of torsion springs 58 and 60. In the illustrated example, each of first and second torsion 58 and 60 includes three segments 76. However, alternative folded configurations may include more than three segments 76.

Figure 1:
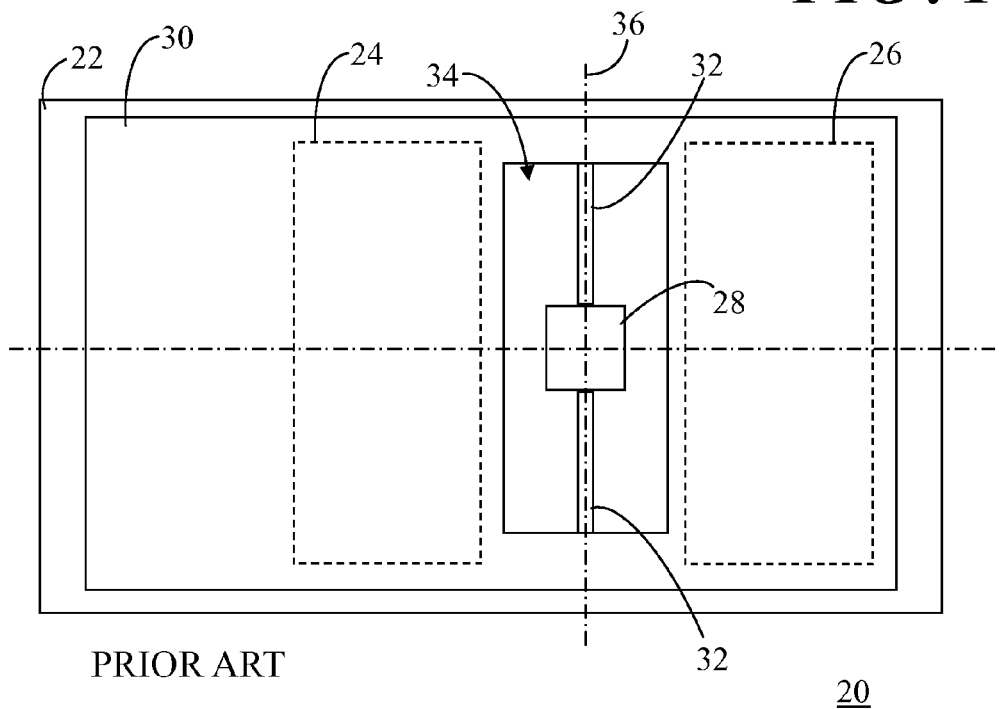
FIG. 1 shows a top view of a prior art MEMS capacitive accelerometer which is adapted to sense z-axis acceleration.

In an embodiment, bar elements 78 are substantially perpendicular to rotational axis 66 but parallel to planar surface 48 of substrate 46. As particularly illustrated in the enlarged top view of FIG. 4, each bar elements 78 exhibit a length 80 that is considerably less than a length 82 of each of segments 76. Thus, the material properties of bar elements 78 do not significantly contribute to the torsion capability of first and second folded torsion springs 58 and 60. Rather, it is the collective combination of each of segments 76 arranged parallel to rotational axis 66 that produce a desired effect of enabling rotation of movable element 56 about rotational axis 66 in response to acceleration 44. And, indeed, the summation of lengths 82 of each of segments 76 yields approximately the same torsional spring constant as a straight bar torsion spring, such as torsion springs 32 (FIG. 1) of an equivalent total length. However, due to the "folded" configuration of three segments 76, the physical space occupied by either of first and second torsion springs 58 and 60, is approximately one third that of a conventional straight bar torsion spring exhibiting the same torsional spring constant.

MEMS sensor applications are calling for lower temperature coefficient of offset (TCO) specifications. TCO is a measure of how much thermal stresses effect the performance of a semiconductor device, such as a MEMS sensor. A high TCO indicates correspondingly high thermally induced stress, or a MEMS device that is very sensitive to such a stress. The packaging of MEMS sensor applications often uses materials with dissimilar coefficients of thermal expansion. Thus, an undesirably high TCO can develop during manufacture or operation. In addition, stresses can result from soldering the packaged semiconductor device onto a printed circuit board in an end application. The combination of stresses and the material properties of the MEMS device can result in strain, i.e., deformation, in substrate 46. Suspension anchor 54 can also experience this strain, or deformation, via the underlying substrate 46. The strain in suspension anchor 54 can cause some rotation of movable element 56 about rotational axis 66 resulting in measurement inaccuracies, thus adversely affecting capacitive accelerometer 40 output.

Per convention, elements in a MEMS sensor are typically arranged according to the principle of reflection symmetry in which the elements are arranged relative to an axis of symmetry. An axis of symmetry is a line in a geometric figure which divides the figure into two parts such that one part, when folded over along the axis of symmetry, coincides with the other part. The components of prior art MEMS sensor 20 (FIG. 1) are arranged in accordance with reflection symmetry. Unfortunately, a hypothetical arrangement of folded torsion springs in reflection symmetry could lead to undesirably high strain and measurement inaccuracies due to the TCO effect.

Accordingly, first and second folded torsion springs are not arranged in accordance with reflection symmetry. Rather, as shown in FIG. 2, second folded torsion spring 60 is generally oriented in rotational symmetry relative to first folded torsion spring 58 about a centroid 84 of suspension anchor 54 in order to counteract the problem of strain at suspension anchor 54 causing measurement inaccuracies. The term "rotational symmetry" utilized herein refers to an arrangement in which second folded torsion spring 60 is rotated about centroid 84 relative to first folded torsion spring 58, but "still looks the same" as first folded torsion spring 58. That is, every point on first folded torsion spring 58 has a matching point on second folded torsion spring 60 that is the same distance from centroid 84, but in the opposite direction. This rotational symmetry is represented in FIG. 2 by an arrow 85. In an embodiment, second folded torsion spring 60 is located in an orientation that is rotated about centroid 84 of suspension anchor 54 approximately one hundred and eighty degrees relative to first folded torsion spring 58. This configuration is sometimes referred to as "second degree rotational symmetry."

First folded torsion spring 58 has an end 86 coupled to a first side 88 of suspension anchor 54 and another end 90 coupled to inner edge portion 63 of movable element 56. Likewise, second folded torsion spring 60 has an end 92 coupled to a second side 94 of suspension anchor 54 that opposes first side 88 of suspension anchor 54. Another end 96 of second folded torsion spring 60 is also coupled to inner edge portion 63 of movable element. In the illustrative embodiment, ends 86 and 90 of first folded torsion spring 58 are not aligned with one another. Rather, they are laterally displaced from one another relative to axis of symmetry 66. Likewise, ends 92 and 96 of second folded torsion spring 60 are laterally displaced from one another relative to axis of symmetry 66.

Due to the rotationally symmetric arrangement of first and second torsion springs 58 and 60, end 86 of first folded torsion spring 58 and end 92 of second folded torsion spring 60, each of which are coupled to suspension anchor 54, are displaced away from and on opposite sides of axis of symmetry 66 by an equivalent distance 98. Thus, any strain experienced through suspension anchor 54 at end 86 of first folded torsion spring 58 is balanced by a generally equal and opposite strain experienced through suspension anchor 54 at end 92 of second folded torsion spring 60. Consequently, this rotationally symmetric arrangement effectively cancels measurement error due to TCO effects.

In an embodiment, first and second folded torsion springs 58 and 60, respectively have corresponding ends 86 and 92 displaced from and on opposite sides of rotational axis 66. However, it should be understood that in alternative embodiments, the attachment points of two folded torsion springs to suspension anchor 54 may lie on axis of rotation 66, whereas the attachment points of the folded springs to movable element 56 may be displaced away from and on opposite sides of axis of rotation 66 by an equivalent distance. In still other alternative embodiments, neither end of each folded torsion spring need lie on axis of rotation 66, as long as the folded torsion springs are oriented in rotational symmetry relative to one another.

Embodiments described herein comprise a microelectromechanical systems (MEMS) sensor that includes multi-segment folded torsion springs that suspend a movable element, i.e. a proof mass, above an underlying substrate. The multi-segment folded torsion springs achieve a reduced size relative to a straight bar torsion spring having an equivalent torsional spring constant. In addition, the multi-segment folded torsion springs are oriented relative to an axis of rotation to minimize measurement errors due to thermally induced stress. The spring orientation is based upon rotational symmetry in which one folded torsion spring is oriented relative to the other folded torsion spring such that every point on one folded torsion spring has a matching point on the other folded torsion spring that is the same distance from a centroid of the suspension anchor, but in the opposite direction. Thus, the multi-segment folded torsion springs can be implemented in a MEMS sensor design having an overall smaller area while meeting stringent TCO specifications. Furthermore, such a MEMS sensor can be readily implemented as a low cost, compact, single die transducer utilizing conventional manufacturing processes.

Although the preferred embodiments of the invention have been illustrated and described in detail, it will be readily apparent to those skilled in the art that various modifications may be made therein without departing from the spirit of the invention or from the scope of the appended claims. For example, the folded torsion springs may be formed from a different number and/or shape of segments than that which is illustrated, as long as they are arranged rotationally symmetric relative to one another.

What is claimed is:

1. A microelectromechanical systems (MEMS) sensor comprising:
   a substrate;
   a movable element positioned in spaced apart relationship above a surface of said substrate, said movable element being adapted for motion relative to a rotational axis positioned between first and second ends of said movable element;
   a suspension anchor formed on said surface of said substrate, a centroid of suspension anchor being located at said rotational axis;
   a first folded torsion spring interconnecting said movable element with said suspension anchor, said first folded torsion spring having a first end coupled to said suspension anchor; and
   a second folded torsion spring interconnecting said movable element with said suspension anchor, said second folded torsion spring having a second end coupled to said suspension anchor, said first and second folded torsion springs having a substantially equivalent shape, said second folded torsion spring being generally oriented in rotational symmetry relative to said first folded torsion spring about said centroid of said suspension anchor, and each of said first and second ends of said first and second folded torsion springs being displaced away from and on opposite sides of said rotational axis by a substantially equivalent distance.

2. A MEMS sensor as claimed in claim 1 wherein said second folded torsion spring is located in an orientation that is rotated about said centroid of said suspension anchor approximately one hundred and eighty degrees relative to said first folded torsion spring.

3. A MEMS sensor as claimed in claim 1 wherein each of said first and second folded torsion springs is arranged generally parallel to said rotational axis.

4. A MEMS sensor as claimed in claim 1 wherein each of said first and second folded torsion springs includes multiple segments aligned substantially parallel to said rotational axis, said segments being linked together in serpentine fashion by bar elements.

5. A MEMS sensor as claimed in claim 4 wherein each of said bar elements exhibits a first length that is less than a second length of said segments.

6. A MEMS sensor as claimed in claim 4 wherein said each of said first and second folded torsion springs includes at least three of said segments.

7. A MEMS sensor as claimed in claim 1 wherein:
   said movable element includes an opening extending through said movable element, said opening being delineated by an inner edge portion of said movable element;
   said suspension anchor is centered in said opening;
   said first end of said first folded torsion spring is coupled to a first side of said suspension anchor;
   said second end of said second folded torsion spring is coupled to a second side of said suspension anchor opposite said first side;
   said first folded torsion spring has a third end coupled to said inner edge portion of said movable element; and
   said second folded torsion spring has a fourth end coupled to said inner edge portion of said movable element.

8. A MEMS sensor as claimed in claim 1 wherein said sensor further comprises a sensing element disposed on said substrate beneath said movable element, said sensing element being adapted to detect movement of said movable element about said rotational axis from a first position to a second position along an axis perpendicular to a plane of said substrate.

9. A device comprising:
   a microelectromechanical systems (MEMS) sensor, said MEMS sensor comprising:
      a substrate;
      a movable element positioned in spaced apart relationship above a surface of said substrate, said movable element being adapted for motion relative to a rotational axis positioned between first and second ends of said movable element;
      a suspension anchor formed on said surface of said substrate, said suspension anchor having a centroid located at said rotational axis;
      a first folded torsion spring interconnecting said movable element with said suspension anchor, said first folded torsion spring having a first end coupled to said suspension anchor; and
      a second folded torsion spring interconnecting said movable element with said suspension anchor, said second folded torsion spring having a second end coupled to said suspension anchor, said first and second folded torsion springs having a substantially equivalent shape, said second folded torsion spring being generally oriented in rotational symmetry relative to said first folded torsion spring about said centroid of said suspension anchor, each of said first and second ends of said first and second folded torsion springs being displaced away from and on opposite sides of said rotational axis by a substantially equivalent distance, and each of said first and second folded torsion springs includes multiple segments aligned substantially parallel to said rotational axis, said segments being linked together in serpentine fashion by bar elements.

10. A device as claimed in claim 9 wherein said second folded torsion spring is located in an orientation that is rotated about said centroid of said suspension anchor approximately one hundred and eighty degrees relative to said first folded torsion spring.

11. A device as claimed in claim 9 wherein each of said bar elements exhibits a first length that is less than a second length of said segments.

12. A device as claimed in claim 9 wherein said each of said first and second folded torsion springs includes at least three segments.

13. A device as claimed in claim 9 wherein:
said movable element includes an opening extending through said movable element, said opening being delineated by an inner edge portion of said movable element;
said suspension anchor is centered in said opening;
said first end of said first folded torsion spring is coupled to a first side of said suspension anchor;
said second end of said second folded torsion spring is coupled to a second side of said suspension anchor opposite said first side;
said first folded torsion spring has a third end coupled to said inner edge portion of said movable element; and
said second folded torsion spring has a fourth end coupled to said inner edge portion of said movable element.

14. A device as claimed in claim 9 wherein said MEMS sensor further comprises a sensing element disposed on said substrate beneath said movable element, said sensing element being adapted to detect movement of said movable element about said rotational axis from a first position to a second position along an axis perpendicular to a plane of said substrate.

15. A microelectromechanical (MEMS) sensor comprising:
a substrate;
a movable element positioned in spaced apart relationship above a surface of said substrate, said movable element including an opening extending through said movable element, said opening being delineated by an inner edge portion of said movable element, and said movable element is adapted for motion relative to a rotational axis positioned between first and second ends of said movable element;
a suspension anchor formed on said surface of said substrate and centered in said opening;
a first folded torsion spring interconnecting said movable element with said suspension anchor and arranged generally parallel to said rotational axis, said first folded torsion spring having a first end coupled to a first side of said suspension anchor and a second end coupled to said inner edge portion of said movable element; and
a second folded torsion spring interconnecting said movable element with said suspension anchor and arranged generally parallel to said rotational axis, said second folded torsion spring having a third end coupled to a second side of said suspension anchor opposite said first side and a fourth end coupled to said inner edge portion of said movable element, said first and second folded torsion springs having a substantially equivalent shape, said second folded torsion spring being generally oriented in rotational symmetry relative to said first folded torsion spring about a centroid of said suspension anchor, and each of said first and third ends of said first and second folded torsion springs is displaced away from and on opposite sides of said rotational axis by a substantially equivalent distance.

16. A MEMS sensor as claimed in claim 15 wherein said second folded torsion spring is located in an orientation that is rotated about said centroid of said suspension anchor approximately one hundred and eighty degrees relative to said first folded torsion spring.

17. MEMS sensor as claimed in claim 15 wherein said centroid of suspension anchor is located at said rotational axis.

18. A MEMS sensor as claimed in claim 15 wherein each of said first and second folded torsion springs includes at least three segments aligned parallel to said rotational axis, said segments being linked together in serpentine fashion by bar elements, each of said bar elements exhibiting a first length that is less than a second length of said segments.

19. A MEMS sensor as claimed in claim 15 further comprising a sensing element disposed on said substrate beneath said movable element, said sensing element being adapted to detect movement of said movable element about said rotational axis from a first position to a second position along an axis perpendicular to a plane of said substrate.

* * * * *